(12) United States Patent
Kanani et al.

(10) Patent No.: US 11,010,768 B2
(45) Date of Patent: May 18, 2021

(54) CHARACTER-BASED ATTRIBUTE VALUE EXTRACTION SYSTEM

(71) Applicant: Oracle International Corporation, Redwood Shores, CA (US)

(72) Inventors: Pallika Haridas Kanani, Westford, MA (US); Michael Louis Wick, Medford, MA (US); Adam Craig Pocock, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 565 days.

(21) Appl. No.: 14/700,683

(22) Filed: Apr. 30, 2015

(65) Prior Publication Data

US 2016/0321358 A1    Nov. 3, 2016

(51) Int. Cl.
  *G06Q 30/00*    (2012.01)
  *G06F 40/284*   (2020.01)
  *G06K 9/72*     (2006.01)
  *G06F 16/84*    (2019.01)

(52) U.S. Cl.
  CPC ............ *G06Q 30/00* (2013.01); *G06F 16/88* (2019.01); *G06F 40/284* (2020.01); *G06K 9/72* (2013.01)

(58) Field of Classification Search
  CPC ... G06Q 30/00; G06F 17/277; G06F 17/3092; G06K 9/72
  USPC ........................................................ 707/737
  See application file for complete search history.

(56) References Cited

U.S. PATENT DOCUMENTS

| | | | | |
|---|---|---|---|---|
| 5,267,325 A * | 11/1993 | Barron | ................... | G06K 9/32 382/174 |
| 5,890,103 A * | 3/1999 | Cams | ................... | G06F 40/284 704/9 |
| 6,016,467 A * | 1/2000 | Newsted | ................... | G06F 8/33 704/9 |
| 6,233,545 B1 * | 5/2001 | Datig | ................... | G06N 3/004 704/2 |
| 6,536,272 B1 * | 3/2003 | Houston | ................... | G01N 1/12 702/2 |

(Continued)

OTHER PUBLICATIONS

Rayid Ghani et al., "Text Mining for Product Attribute Extraction", SIGKDD Explor. Newsl., vol. 8, Issue 1, pp. 41-48, Jun. 2006.

(Continued)

*Primary Examiner* — Ashish Thomas
*Assistant Examiner* — Abdullah A Daud
(74) *Attorney, Agent, or Firm* — Potomac Law Group, PLLC

(57) ABSTRACT

A system is provided that extracts attribute values. The system receives data including unstructured text from a data store. The system further tokenizes the unstructured text into tokens, where a token is a character of the unstructured text. The system further annotates the tokens with attribute labels, where an attribute label for a token is determined, in least in part, based on a word that the token originates from within the unstructured text. The system further groups the tokens into text segments based on the attribute labels, where a set of tokens that are annotated with an identical attribute label are grouped into a text segment, and where the text segments define attribute values. The system further stores the attribute labels and the attribute values within the data store.

20 Claims, 9 Drawing Sheets

(56) References Cited

U.S. PATENT DOCUMENTS

| | | | |
|---|---|---|---|
| 7,302,493 B1* | 11/2007 | Alles | H04L 47/10 370/389 |
| 7,606,797 B2 | 10/2009 | McCammon et al. | |
| 7,689,527 B2 | 3/2010 | Pavlov et al. | |
| 7,921,097 B1* | 4/2011 | Dandekar | G06F 16/9566 707/707 |
| 8,041,721 B2 | 10/2011 | Tago | |
| 8,285,697 B1 | 10/2012 | Truher | |
| 8,314,730 B1* | 11/2012 | Musiak | G01S 7/003 342/25 B |
| 8,463,738 B2 | 6/2013 | Mizguchi et al. | |
| 8,645,073 B2 | 2/2014 | Gilbert et al. | |
| 9,679,049 B2* | 6/2017 | Knight | G06F 16/954 |
| 2004/0243645 A1* | 12/2004 | Broder | G06F 16/313 |
| 2005/0119873 A1* | 6/2005 | Chaney | G06F 16/30 704/1 |
| 2005/0240424 A1 | 10/2005 | Lin et al. | |
| 2006/0190684 A1* | 8/2006 | McCammon | G06F 16/319 711/117 |
| 2006/0253476 A1* | 11/2006 | Roth | G06F 17/2211 |
| 2008/0243905 A1 | 10/2008 | Pavlov et al. | |
| 2009/0216751 A1 | 8/2009 | Tago | |
| 2009/0228245 A1* | 9/2009 | Gilbert | G01N 30/8624 703/2 |
| 2009/0281791 A1* | 11/2009 | Li | G06F 17/2755 704/9 |
| 2010/0195909 A1* | 8/2010 | Wasson | G06F 40/169 382/176 |
| 2010/0256969 A1* | 10/2010 | Li | G06K 9/6296 703/16 |
| 2010/0274770 A1 | 10/2010 | Gupta et al. | |
| 2010/0318525 A1 | 12/2010 | Mizuguchi et al. | |
| 2011/0184893 A1* | 7/2011 | Paparizos | G06F 16/24573 706/12 |
| 2012/0130995 A1* | 5/2012 | Risvik | G06F 16/951 707/723 |
| 2012/0303355 A1* | 11/2012 | Liu | G06F 40/274 704/9 |
| 2013/0030787 A1* | 1/2013 | Cancedda | G06F 17/2881 704/2 |
| 2013/0173258 A1* | 7/2013 | Liu | G06F 40/40 704/9 |
| 2014/0089340 A1* | 3/2014 | Zhu | G06F 16/2379 707/769 |
| 2014/0201229 A1* | 7/2014 | Kirazci | G06F 16/3323 707/767 |
| 2014/0324740 A1* | 10/2014 | Garera | G06N 5/022 706/12 |
| 2014/0324819 A1* | 10/2014 | Risvik | G06F 16/951 707/711 |
| 2015/0331936 A1* | 11/2015 | Alqadah | G06F 16/313 707/739 |
| 2016/0042359 A1* | 2/2016 | Singh | G06F 40/58 704/2 |
| 2016/0155058 A1* | 6/2016 | Oh | G06N 20/10 706/11 |
| 2016/0239758 A1* | 8/2016 | Jeong | G06N 20/00 |
| 2016/0246776 A1* | 8/2016 | Zhao | G06F 17/278 |
| 2017/0212921 A1* | 7/2017 | Wu | G06N 7/005 |
| 2017/0277998 A1* | 9/2017 | Knight | G06F 16/35 |

OTHER PUBLICATIONS

Jeff Huang et al., "RevMiner: An Extractive Interface for Navigating Reviews on a Smartphone", In Proceedings of the 25th Annual ACM Symposium on User Interface Software and Technology, UIST '12, pp. 3-12, New York, NY, USA. ACM, Oct. 7-10, 2012.

Dan Klein et al., "Named Entity Recognition with Character-Level Models", In Proceedings of the Seventh Conference on Natural Language Learning at HLTNAACL 2003—vol. 4, CONLL '03, pp. 180-183, Stroudsburg, PA, USA. Association for Computational Linguistics.

Karin Mauge et al., "Structuring E-Commerce Inventory", In Proceedings of the 50th Annual Meeting of the Association for Computational Linguistics: Long Papers—vol. 1, ACL '12, pp. 805-814, Stroudsburg, PA, USA. Association for Computational Linguistics, 2012.

Katharina Probst et al., "Semi-Supervised Learning of Attribute-Value Pairs from Product Descriptions", In Proceedings of the 20th International Joint Conference on Artificial Intelligence, IJCAI'07, pp. 2838-2843, San Francisco, CA, USA. Morgan Kaufmann Publishers Inc., 2007.

Duangmanee (Pew) Putthividhya et al., "Bootstrapped Named Entity Recognition for Product Attribute Extraction", In Proceedings of the Conference on Empirical Methods in Natural Language Processing, EMNLP '11, pp. 1557-1567, Stroudsburg, PA, USA. Association for Computational Linguistics, 2011.

Priya Radhakrishnan et al., "Modeling the Evolution of Product Entities", In Proceedings of the 37th International ACM SIGIR Conference on Research & Development in Information Retrieval, SIGIR '14, pp. 923-926, New York, NY, USA. ACM, 2014.

Tong Zhang et al., "A Robust Risk Minimization based Named Entity Recognition System", In Proceedings of the Seventh Conference on Natural Language Learning at HLT-NAACL 2003—vol. 4,CONLL '03, pp. 204-207, Stroudsburg, PA, USA. Association for Computational Linguistics, 2003.

John D. Lafferty et al., "Conditional Random Fields: Probabilistic Models for Segmenting and Labeling Sequence Data", In Proceedings of the Eighteenth International Conference on Machine Learning, ICML '01, pp. 282-289, 2001.

Wei Li et al., "Rapid Development of Hindi Named Entity Recognition using Conditional Random Fields and Feature Induction (Short Paper)", ACM Trans. on Computational Logic, 2(3):290-294, Sep. 2003.

Fuchun Peng et al., "Information extraction from research papers using conditional random fields", Inf. Process. Manage., 42(4):963-979, Jul. 2006.

Charles Sutton et al., "An Introduction to Conditional Random Fields", Foundations and Trends in Machine Learning, 4(4):pp. 267-373, 2012.

Oracle Data Sheet, "Oracle Enterprise Data Quality Product Family", Copyright 2014.

Oracle Data Sheet, "Oracle Enterprise Data Quality for CRM", Copyright 2014.

Oracle Data Sheet, "Oracle Retail Data Model", Copyright 2012.

Oracle Commerce, "Oracle Commerce End-to-End Digital Experience Platform", Copyright 2014.

\* cited by examiner

CHARACTER-BASED ATTRIBUTE VALUE EXTRACTION SYSTEM

FIELD

One embodiment is directed to a computer system, and more particularly, to a computer system that extracts data.

BACKGROUND

Attribute extraction is the problem of automatically populating fields in a database with attribute values inferred from natural language text or other data, such as a product description. More specifically, a system is typically given a collection of unstructured "noisy" text (i.e., text that may not be understood and interpreted correctly by the system) and a list of attributes of interest. The goal of the system is to automatically find the value of each attribute within the text and extract the value. Often, these attribute values are explicitly present in the text, but may contain "noise", such as abbreviations, spelling errors or non-standard punctuation. Inconsistent spacing is a form of noise and a rampant problem in many datasets. Sometimes, the attribute values are missing and must be inferred from other indirect evidence, such as the existing test or other attribute values.

SUMMARY

One embodiment is a system that extracts attribute values. The system receives data including unstructured text from a data store. The system further tokenizes the unstructured text into tokens, where a token is a character of the unstructured text. The system further annotates the tokens with attribute labels, where an attribute label for a token is determined, in least in part, based on a word that the token originates from within the unstructured text. The system further groups the tokens into text segments based on the attribute labels, where a set of tokens that are annotated with an identical attribute label are grouped into a text segment, and where the text segments define attribute values. The system further stores the attribute labels and the attribute values within the data store. In one embodiment, the system can further: pair an attribute value with target attribute values; select a target attribute value that has a highest probability of matching the attribute value; and replace the attribute value with the selected target attribute value.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
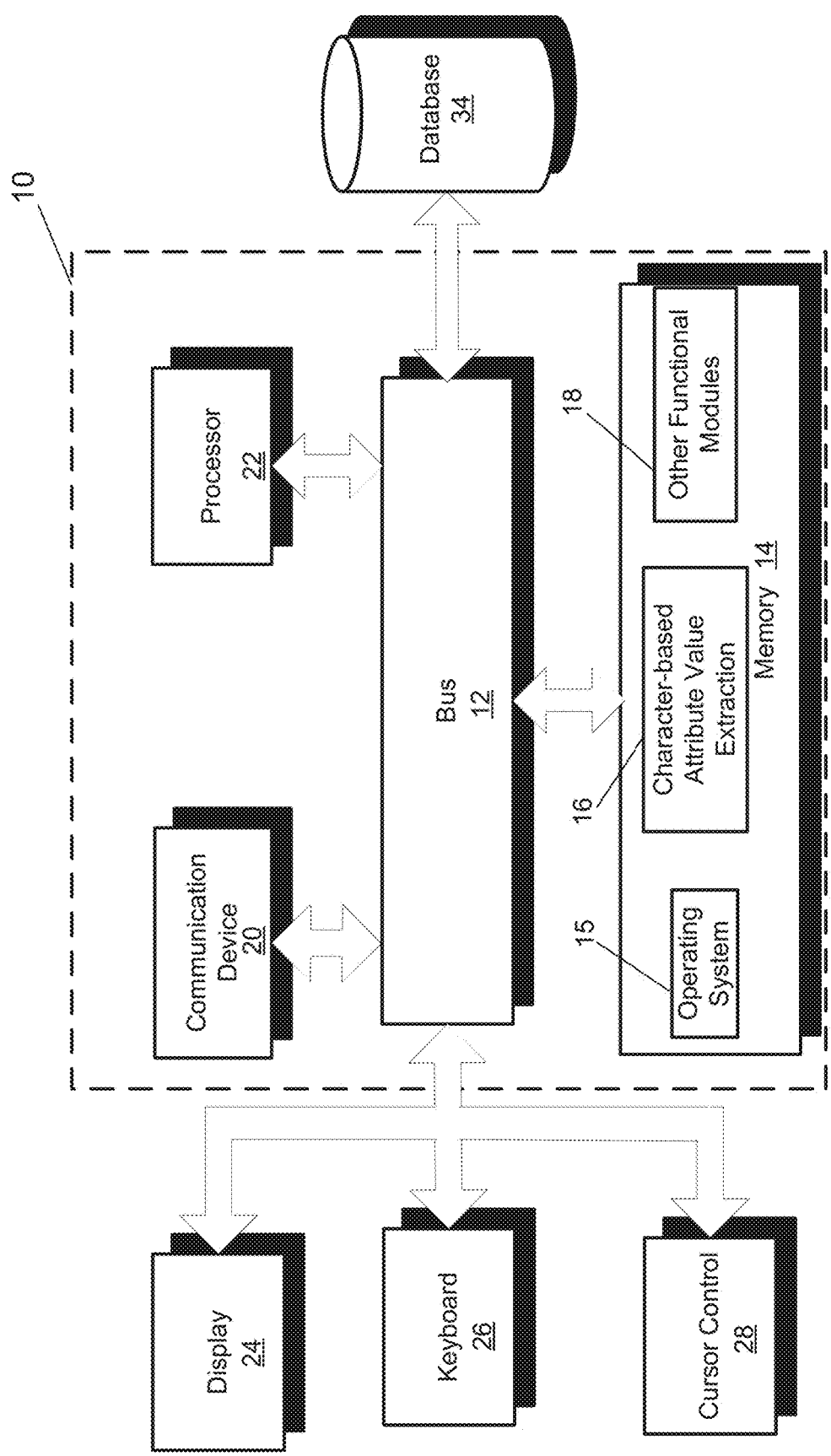
FIG. 1 illustrates a block diagram of a system that can implement an embodiment of the invention.

According to an embodiment, a character-based attribute value extraction system is provided. The character-based attribute value extraction system can extract attribute values from unstructured text, such as product descriptions found in retail systems, where the unstructured text explicitly, or implicitly, includes the attribute values. The character-based attribute value extraction system can extract the attribute values by first sequence tagging (i.e., annotating) the text with attribute labels. The sequence tagging can be character-based sequence tagging, where the character-based attribute value extraction system can sequence tag the text using character-based tokens, where a character-based token is a character of the text, and where the character-based attribute value extraction system can further annotate each character-based token with a label for the attribute value that it is a part of. Using character-based tokens can also be identified as character-based annotation, and the character-based annotation can be implemented using character-based conditional random fields ("CRFs"), where a CRF is a classifier, or class of statistical modelling method, used to predict a label for a value, where the CRF can take context (e.g., a sequence of values) into account. In other words, a CRF is a sequence labeling model, which is a function that maps a sequence of tokens to a sequence of labels. The function can be parameterized by a set of weights which can be learned from example data, such as example data that is manually annotated by a human user. More specifically, the example data can include an input set, or sequence, of tokens, and an output set, or sequence, of attribute values manually annotated by the human user, where the input set and output set can be organized as a set of token-attribute value pairs. Once the CRF is trained on example data, the function can be used to predict attributes for new un-annotated data. As part of character-based annotation, the character-based attribute value extraction system can further identify an original word that a character originates from within the unstructured text, and use the features of the original word as evidence of an attribute label assigned to the character-based token.

The character-based attribute value extraction system can further represent the annotations of the character-based tokens as an annotation string, and can display, or otherwise visualize, the annotation string either below or above the unstructured text, allowing for manual annotation (such as manual annotation by a human user), if necessary. This manual annotation is separate from any manual annotation performed during training of the CRF, and can be implemented to correct any mistaken attribute labels that are assigned to corresponding character-based tokens. In one embodiment, the display, or other type of visualization of the annotation string, can use a fixed-width font. However, in other embodiments, other fonts can be used. Based on the annotation, the character-based attribute value extraction system can extract text segments from the unstructured text, where an extracted text segment represents an extracted attribute value. Once the character-based attribute value extraction system has extracted attribute values from the unstructured text, the character-based attribute value extraction system can normalize the extracted attribute values by pairwise linking the extracted attribute values (e.g., text segments) to a target knowledge base of attribute values. Such normalized extracted attributes values can further be utilized in downstream analytics systems.

Thus, in accordance with an embodiment, the attribute extraction of the character-based attribute value extraction system can include the following components: a character-based model for sequence tagging, a scheme for representing automatic (and possibly manual) annotations, and an application of pairwise entity-linking to solve a problem of attribute normalization. Typically, in a linear chain CRF used for entity extraction, tokens are word-based tokens, where each word-based token is considered an observation, and a corresponding latent variable represents a state, or label, for the word-based token. In contrast, according to an embodiment, tokens are character-based tokens, where each character-based token is considered an observation in the CRF, and the noisy word-based tokens are treated as additional evidence for predicting the labels for the character-based tokens. Further, in accordance with an embodiment, the character-based attribute extraction system utilizes a scheme for representing character-based annotations in which: each attribute label is represented as a single character; the annotated attributes labels are collectively represented as an annotation string; and the annotation string is displayed below the unstructured text, using a fixed-width font, for rapid manual annotation. Even further, in accordance with an embodiment, the character-based attribute extraction system utilizes a classification-based, pairwise approach to link extracted attribute values (e.g., text segments) to a target knowledge base of attribute values.

Historically, sequence tagging models for text have typically used words as an atomic unit of observation. Further, linear-chain CRFs have been utilized to extract names of people, places, and organizations from unstructured text (e.g., newspaper articles), using these word-based models. However, these word-based models are incapable of dealing with text that contains inconsistent spacing. In accordance with certain embodiments, by utilizing a character-based model, the character-based attribute extraction system can circumvent the issue of inconsistent spacing by using characters as an atomic unit of observation. Further, characters by themselves typically do not have enough information to make decisions regarding an attribute label for a hidden attribute value. The character-based attribute extraction system can address this problem by utilizing the noisy word-based token that the character originates from as evidence in the CRF, rather than utilizing the word-based token as an atomic unit of observation. Further, the representation scheme utilized by the character-based attribute extraction system for annotation data can alleviate a burden of manually labeling individual characters.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a character-based attribute value extraction module 16, as well as other functional modules 18. Operating system 15 can provide an operating system functionality for system 10. Character-based attribute value extraction module 16 can provide functionality for extracting attribute values, as further disclosed below. In certain embodiments, character-based attribute value extraction module 16 can comprise a plurality of modules, where each module provides specific individual functionality for extracting attribute values. The modules can include: a data reception module that can provide functionality for receiving data including unstructured text from a data store; a tokenization module that can provide functionality for tokenizing unstructured text into one or more tokens, where a token is a character of the unstructured text; an annotation module that can provide functionality for: (a) providing training data that includes one or more tokens and one or more attribute labels; or (b) annotating one or more tokens with one or more attribute labels, where an attribute label for a token is determined, at least in part, based on a word that the token originates from within the unstructured text; a token grouping module that can provide functionality for grouping one or more tokens into one or more text segments based on one or more attribute labels, where a set of one or more tokens that are annotated with an identical attribute label are grouped into a text segment, and where the one or more text segments define one or more attribute values; and an attribute storage module that can provide functionality for storing one or more attribute labels and one or more attribute values within the data store. System 10 can also be part of a larger system. Thus, system 10 can include one or more additional functional modules 18 to include the additional functionality. For example, functional modules 18 may include modules that provide additional functionality, such as functionality of an "Oracle Enterprise Data Quality" product by Oracle Corporation, an "Oracle Retail Data Model" product by Oracle Corporation, or an "Oracle Web Commerce" product by Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

As previously described, a large amount of text that is typically found in industrial databases, such as product descriptions that contain attributes, such as a color or size of a garment; a packet size, a brand, or a flavor of a grocery food item, is unstructured and noisy. Often, there are multiple pieces of information contained in this raw text, which would be significantly more valuable if available in structured form, such as key-value pairs (e.g., attributes, where an attribute is an attribute label-value pair that includes an attribute label paired with an attribute value). The extracted attribute values can subsequently be used to form a basis of advanced analytics and predictive models. This process is known as "attribute extraction". Attributes are generally more useful than raw unstructured text for application areas, such as e-commerce and retail analytics.

An important part of automating an attribute extraction process is to define the attribute extraction process as an entity recognition problem, with attributes as entities. Typically, entity recognition is usually solved as a sequence labeling problem in which observed elements of a sequence are defined as tokens, and each token is associated with a hidden label variable. Thus, tokenization can be seen as a prerequisite to attribute extraction that is typically taken for granted as a solved problem. Indeed, for many types of named entity recognition tasks, from newswire to social media texts, tokenization can be easily solved with simple regular expressions (e.g., splitting on white space and punctuation). However, for other types of data, such as product descriptions, medical prescriptions, and optical character recognition ("OCR"), the problem of tokenization can be non-trivial and can be as difficult as the problem of extracting the entities itself.

For example, consider the following product descriptions from a grocer's inventory database: "COCA COLA CHERRY 12x12oz"; "COCA COLA CHERRY 12 12 oz"; and "COCA_COLA CHERRY3LTR". Suppose the goal is to extract the field labels: brand ("B"); pack ("P"); size ("S"); and unit of measurement ("U"), and the rest ("O") is to be ignored. One problem is that the unit of measurement value often occurs immediately after the size value (e.g., "12oz" and "3LTR"). However, this is not always the case, and, thus, a single tokenization of the data would not be sufficient. Another problem is that much of the data was likely entered in haste on a poor-quality computer terminal. Thus the data contains white-spacing errors (e.g., "CHERRY3LTR"). Special case tokenization cannot be used to deal with the unit of measurement and size, because special case tokenization may break an extraction of a brand name, such as "7up".

According to an embodiment, a character-based attribute value extraction system can address the problem of tokenization by utilizing a character-based model in which tokens are defined as characters of the unstructured text rather than words of the unstructured text, and in which attribute labels are associated with each character of the unstructured text rather than each word of the unstructured text. However, words can still provide useful information in many situations. Thus, in addition to the characters of the unstructured text, the character-based attribute value extraction system can also use the original words that the characters originated from within the unstructured text as observed evidence for predicting the attribute labels. For cases in which word-based tokenization is actually correct, the original words can provide a strong signal for predicting the attribute labels associated with the constituent characters. However, for cases in which word-based tokenization is incorrect, the character-based tokens and Markov transition information can override the original word.

Further, in accordance with one embodiment, attributes (more specifically, attribute values) extracted from noisy unstructured text using the character-based model may contain spelling errors, abbreviations, and other non-standard formats. Thus, the character-based attribute value extraction system can further utilize pairwise entity-linking to address this problem. Thus, as described below in greater detail, the character-based attribute extraction system can serve as an end-to-end system for attribute extraction that uses character-based sequence labeling models, along with multiple techniques (including pairwise entity-linking) for normalization.

According to an embodiment, a character-based attribute extraction system receives data that is a collection of unstructured text. In one embodiment, the unstructured text is received from a data store, such as a database. The character-based attribute extraction system is also provided with a list of attribute labels that identify the attributes that are to be extracted from the unstructured text. In one embodiment, the character-based attribute extraction system can find and extract the attributes values from the unstructured text, and can pair the extracted attribute values with the attribute labels. Thus, the character-based attribute extraction system can ultimately generate extracted attributes (e.g., attribute label-value pairs) and can store the extracted attributes within the data store (e.g., database).

The following is an example of an attribute extraction problem. Assume an attribute extraction system receives a product description, "DIET_COKE 6X200ml", where the product description is a collection of unstructured text. The attributes that are to be extracted are: brand name ("B"), pack size ("P"), individual unit size ("S"), and unit of measurement ("U"). The attribute values that the attribute extraction system is required to predict are: brand="Diet Coke"; pack="6"; size="200"; and uom="ml". An expected attribute value for the brand attribute is a cleaned and normalized version of the attribute value that is observed in the unstructured text. The set of attribute values that each attribute can take is identified as a domain of the attribute. For example, a unit of measurement can only take attribute values from a fixed set of values (e.g., "ml", "l", "g", "kg", etc.).

Often, the aforementioned attribute values are explicitly present within the unstructured text, but the attribute values may contain noise, such as abbreviations, spelling errors or non-standard punctuation (e.g., "DIET_COEK"). In particular, inconsistent spacing is typically a rampant problem in many datasets. Sometimes, the attribute values are missing and must be inferred from other indirect evidence, such as the existing unstructured text or other attributes values contained within the unstructured text. For example, if the product description is "DIET_COKE 6X200", the attribute extraction system can infer that the unit of measurement is "ml". In some cases, a domain of attribute values is closed. However, in other cases, the domain of attribute values can be open and can change with time. One example is size, which can take arbitrary values, such as "260 (ml)". Although a retailer may provide the attribute extraction system with a list of all possible sizes, the list might change quickly with time.

In order to address these problems, in accordance with an embodiment of the invention, an attribute extraction process that includes sequence tagging and entity linking is provided. Such an attribute extraction process is described below in greater detail in conjunction with FIGS. 2-8.

Figure 2:
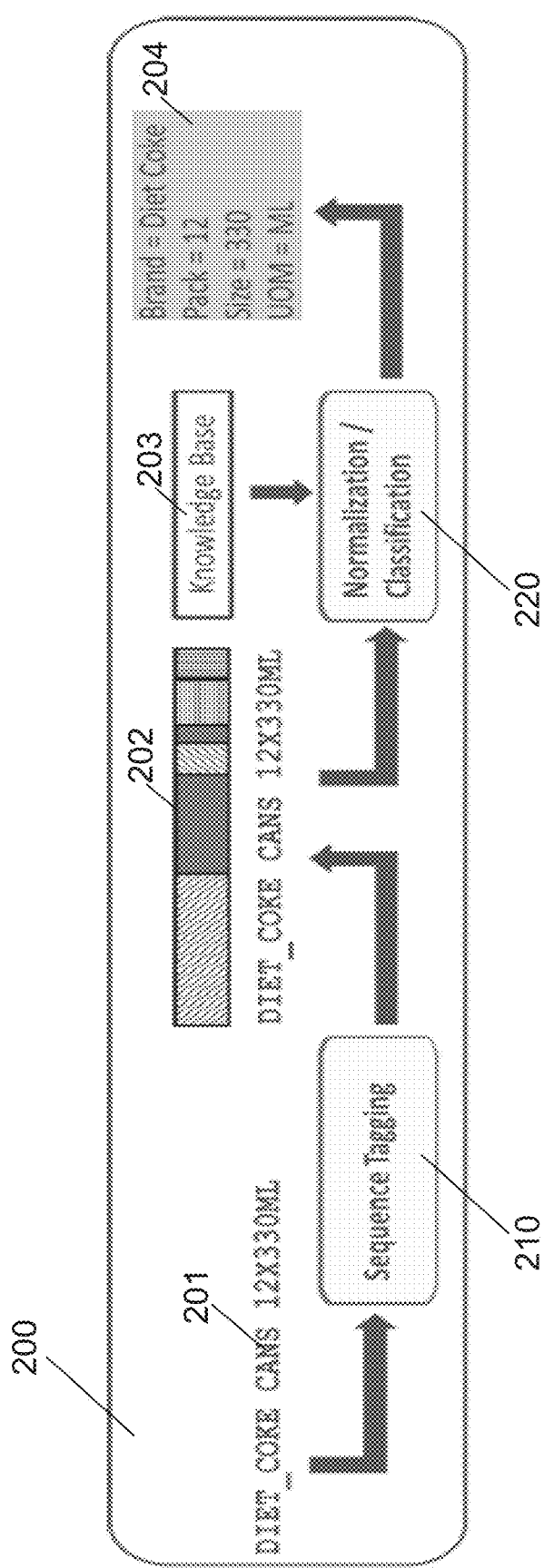
FIG. 2 illustrates an example character-based extraction of attribute values, according to an embodiment of the invention.

FIG. 2 illustrates an example character-based extraction of attribute values 200, according to an embodiment of the invention. In one embodiment, character-based extraction 200 may be implemented by a character-based attribute extraction system (such as system 10 of FIG. 1). According to the embodiment, the character-based attribute extraction system retrieves unstructured text 201. In the illustrated embodiment, unstructured text 201 includes the text string, "DIET_COKE CANS 12X330ML". The character-based attribute extraction system further performs attribute sequence tagging 210 on unstructured text 201 in order to tag (i.e., annotate) unstructured text 201 with attribute labels utilizing character-level tokens, and generate annotation string 202, where annotation string 202 include the annotated attribute labels for unstructured text 201. Attribute sequence tagging 210 is further described below in greater detail in conjunction with FIGS. 3-5 and 7. The character-based attribute extraction system can optionally display, or otherwise visualize, annotation string 202 and unstructured text 201, optionally using a fixed-width font, where a user of the character-based attribute extraction system can optionally perform any desired manual annotation of annotation string 202. Alternatively, the character-based attribute extraction system can generate example data that is subsequently used to train the character-based attribute extraction system to correctly tag (i.e., annotate) unstructured text 201 with attribute labels, where the example data can include an input set, or sequence, of tokens, and an output set, or sequence, of attribute values manually annotated by a user, where the input set and output set can be organized as a set of token-attribute value pairs, and where the character-based attribute extraction system can optionally display, or otherwise visualize, the output set of attribute values to facilitate the manual annotation by the user. Manual annotation is further described below in greater detail in conjunction with FIG. 6. The character-based attribute extraction system further performs attribute normalization 220, where attribute normalization 220 links text sequences (i.e., attribute values) of unstructured text 201 with pre-defined normalized attribute values stored within a knowledge base 203, and derives normalized attribute values for the text sequences (i.e., attribute values) of unstructured text 201. The character-based attribute extraction system further pairs the normalized attribute values with the corresponding attribute labels to generate attribute label-value pairs 204. Attribute normalization 220 is further described below in greater detail in conjunction with FIG. 7.

A component of an attribute execution process implemented by a character-based attribute extraction system in accordance with one embodiment is attribute sequence tagging (such as attribute sequence tagging 210 of FIG. 2). According to an embodiment, attribute sequence tagging is the tagging of unstructured text (such as unstructured text 201 of FIG. 2) with attributes labels. More specifically, given unstructured text, the character-based attribute extraction system tokenizes the unstructured text into a set of tokens, and further annotates each token with an attribute label that corresponds to an attribute value that each token is a part of. Previously, CRFs have been used for a variety of extraction tasks. However, according to an embodiment, as is described below in greater detail, the attribute sequence tagging uses character-based tokens, rather than word-based tokens, in a CRF.

Typically, in a linear chain CRF used for entity (i.e., attribute) extraction, each word-based token (i.e., a token that is a word) is considered an observation, and a corresponding latent variable represents a state, or label, for the word-based token. It can be typical to use a "BIO representation" to annotate attribute values in text, in which each token label is prefixed with a "B" to indicate the beginning of an entity name, an "I" to indicate the inside of an entity name, or an "O" to indicate a background token. However, in accordance with one embodiment, each character-based token (i.e., a token that is a character) is considered an observation in the CRF, along with the BIO representation for the labels. The spaces between the words for an attribute value can be considered to fall inside an entity name. Further, in one example embodiment, a BIO representation to annotate attribute values in text. However, this is only an example embodiment, and, in other alternate embodiments, other types of representations can be used to annotate attribute values in text.

Figure 3:
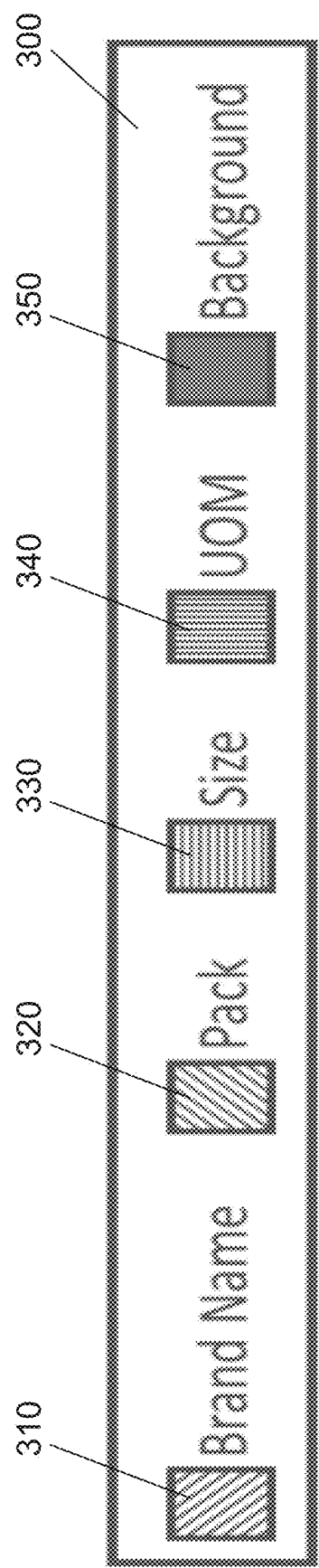
FIG. 3 illustrates an example legend representing an example set of attribute labels and a background noise label, according to an embodiment of the invention.

FIG. 3 illustrates a legend 300 representing an example set of attribute labels and a background noise label, according to an embodiment of the invention. More specifically, legend 300 includes attribute labels 310, 320, 330, and 340, and background noise label 350. Attribute label 310 represents a brand name attribute label, which is a label for a brand name attribute. Attribute label 320 represents a pack size attribute label, which is a label for a pack size attribute. Attribute label 330 represents an individual unit size attribute label, which is a label for an individual unit size attribute. Attribute label 340 represents a unit of measurement attribute label, which is a label for a unit of measurement attribute. Background noise label 350 is a label for background noise (i.e., text that is not part of an attribute value for any attribute).

Figure 4:
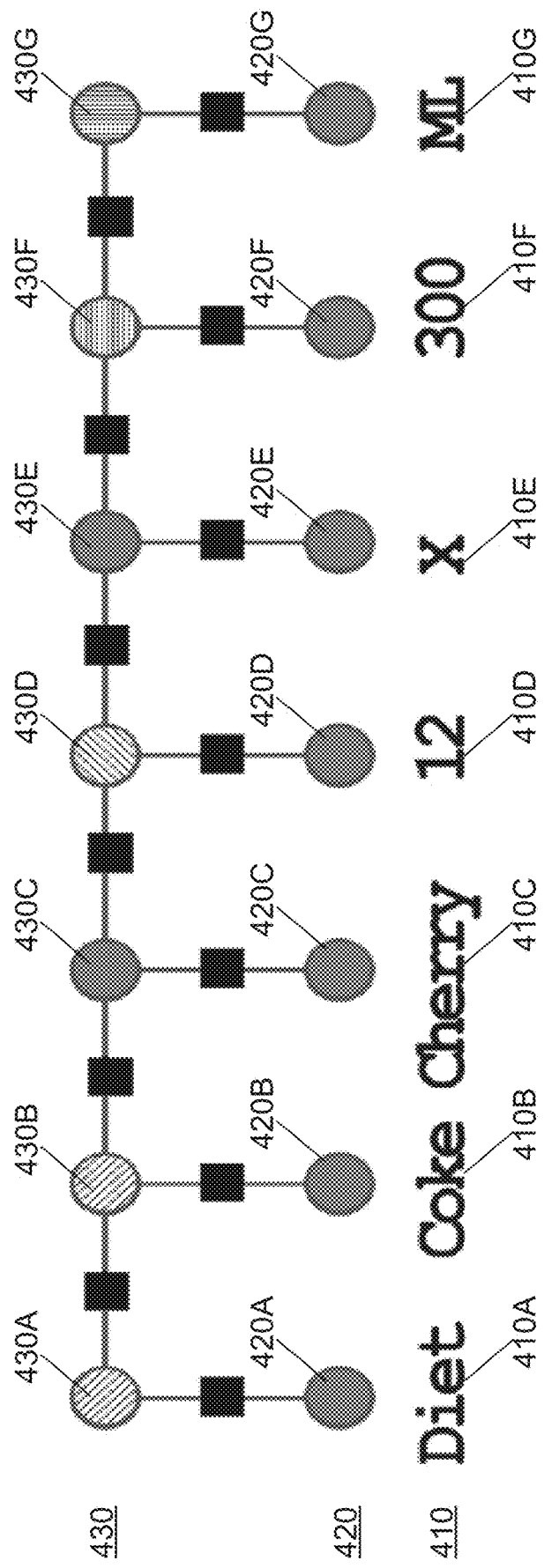
FIG. 4 illustrates an example word-based conditional random field representation of unstructured text.

FIG. 4 illustrates an example word-based conditional random field representation of unstructured text 410. Unstructured text 410 includes the text string "Diet Coke Cherry 12X300 ML". Unstructured text 410 is tokenized into word-based tokens 420, where each word of unstructured text 410 is represented by a word-based token of word-based tokens 420. More specifically, word-based token 420A is generated that represents word 410A (i.e., "Diet"), word-based token 420B is generated that represents word 410B (i.e., "Coke"), word-based token 420C is generated that represents word 410C (i.e., "Cherry"), word-based token 420D is generated that represents word 410D (i.e., "12"), word-based token 420E is generated that represents word 410E (i.e., "X"), word-based token 420F is generated that represents word 410F (i.e., "300"), and word-based token 420G is generated that represents word 410G (i.e., "ML"). Further, labels 430 are assigned to word-based tokens 420, where a label of labels 430 can be either an attribute label or a background label. More specifically, label 430A (i.e., a brand name attribute label) is assigned to word-based token 420A, label 430B (i.e., a brand name attribute label) is assigned to word-based token 420B, label 430C (i.e., a background label) is assigned to word-based token 420C, label 430D (i.e., a pack size attribute label) is assigned to word-based token 420D, label 430E (i.e., a background label) is assigned to word-based token 420E, label 430F (i.e., an individual size attribute label) is assigned to word-based token 420F, and label 430G (i.e., a unit of measurement attribute label) is assigned to word-based token 420G.

Figure 5:
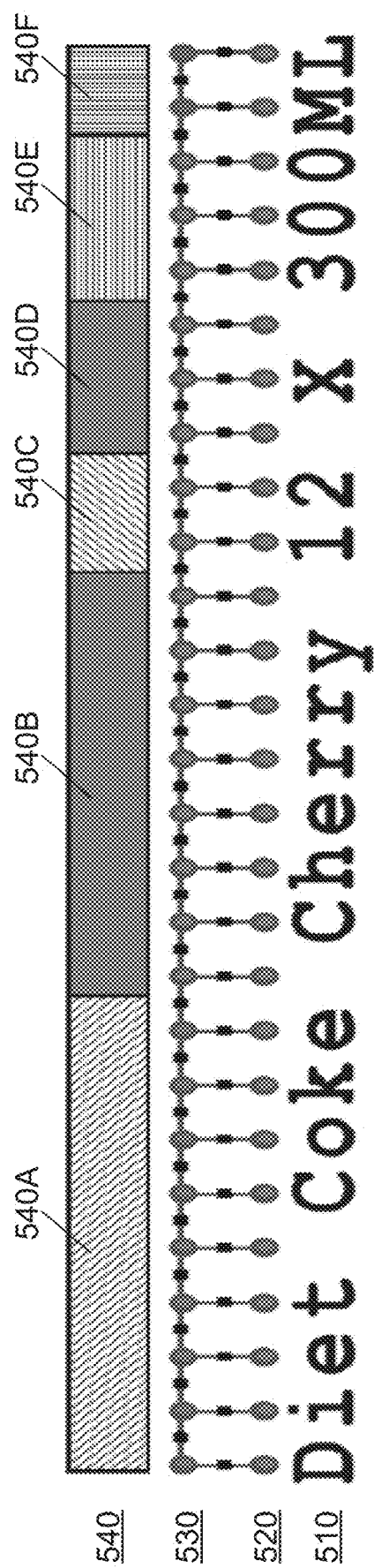
FIG. 5 illustrates an example character-based conditional random field representation of unstructured text, according to an embodiment of the invention.

FIG. 5 illustrates an example character-based conditional random field representation of unstructured text 510, according to an embodiment of the invention. Unstructured text 510 includes the text string "Diet Coke Cherry 12 X 300ML". Unstructured text 510 is very similar to unstructured text 410 of FIG. 4, where the only difference is that unstructured text 510 does not include a space between the text segments "300" and "ML". Unstructured text 510 is tokenized into character-based tokens 520, where each character (as opposed to word) of unstructured text 510 is represented by a character-based token of character-based tokens 520. Further, labels 530 are assigned to character-based tokens 520, where a label of labels 530 can be either an attribute label or a background label. Even further, annotation 540 is generated based on labels 530, where annotation 540 includes annotations of the attribute labels and/or background labels of labels 530. More specifically: annotation 540A is an annotation of a brand name attribute label assigned to the text segment "Diet Coke" of unstructured text 510; annotation 540B is an annotation of a background label assigned to the text segment "Cherry" of unstructured text 510; annotation 540C is an annotation of a pack size attribute label assigned to the text segment "12" of unstructured text 510; annotation 540D is an annotation of a background label assigned to the text segment "X" of unstructured text 510; annotation 540E is an annotation of an individual size attribute label assigned to the text segment "300" of unstructured text 510; and annotation 540F is an annotation of a unit of measurement attribute label assigned to the text segment "ML" of unstructured text 510. As can be seen in the illustrated embodiment of FIG. 5, a character-based CRF model is able to correctly assign different attribute labels for the text segments "300" and "ML" of unstructured text 510, even though the text segments "300" and "ML" are not separated by a space within unstructured text 510. In contrast, a word-based CRF model, such as the word-based CRF model illustrated in FIG. 4, can only correctly assign different attribute labels for the text segments "300" and "ML" of unstructured text 410 if they are separated by a space within unstructured text 410.

Thus, in accordance with an embodiment, a character-based attribute extraction system can apply a CRF to unstructured text, where character-based tokens are used to apply the CRF, rather than word-based tokens. In other words, the character-based attribute extraction system can model each character of the unstructured text as an individual unit rather than each word of the unstructured text. Thus, each character of the unstructured text can be used as a variable of the CRF, rather than each word of the unstructured text, and therefore, each character can be tagged, rather than each word.

In traditional linear chain CRF with word-based observations, lexical features, along with various properties of the word itself, play an important role. According to an embodiment, in utilizing a CRF with character-based observations, characters by themselves do not carry as much information. Thus, in accordance with the embodiment, the character-based attribute extraction system keeps track of an original word that a character came from, and uses the features of this original word, along with those of a character-based token that represents the character, as part of the character-based sequence tagging of unstructured text. More specifically, the character-based attribute extraction system tokenizes the original unstructured text by space to keep track of the original words. Using features of the original words is fundamentally different from using words as observed variables in the CRF, because the original words are now only used as evidence of an attribute label, and, therefore, the character-based CRF model is much more tolerant to the noise in tokenization. Some of the features of using the original word that a character comes from as evidence of an attribute label include: lowercase token; shape; punctuation; existence in lexicons; features from surrounding tokens; size of original word; or position relative to start of collection of unstructured text (e.g., document).

As an example, a character "C" can be modeled, where the character "C" was previously part of the original word "Coke" within a collection of unstructured text. The placement of the character "C" within the original word "Coke" can be treated as evidence that the character "C" identifies a brand name attribute, and thus, the character "C" can be tagged with a tag, or annotated with an annotation, that represents a brand name attribute.

Further, a word-based CRF typically commits to a pre-existing tokenization, and cannot change word boundaries. For example, when a word has two attributes (e.g., "500ml", where "500"→"S", and "ml"→"U"), the word-based CRF can only assign one attribute type. However, in accordance with an embodiment, a character-based CRF does not commit to pre-existing tokenization, and after applying the character-based CRF, a tokenization can result that may not have been done before. In other words, in a character-based CRF, as each character can have one attribute, a single "word" can be labeled with multiple character-level labels. These character-level labels can be used to split up the word into multiple separate tokens, each representing a different attribute (e.g., "500ml" can be split into "500," and "ml"). This allows the character-based attribute extraction system to have more flexibility.

In accordance with an embodiment, once the character-based data extraction system has performed attribute sequence tagging on a collection of unstructured text, the character-based data extraction system can annotate the predicted attribute labels for the character-based tokens of the unstructured text, and thus, generate an annotation. An annotation can be used to train and evaluate the sequence tagging of a CRF, where the annotation can be identified as training data. However, creating an annotation can be a tedious process, even when the annotation includes word-based annotations. When the annotation includes character-based annotations, the tediousness of the annotation process can increase significantly. However, in accordance with an embodiment, the character-based data extraction system can implement a data annotation process that is feasible notwithstanding the required character-based annotations.

According to one embodiment, the CRF model uses a BIO representation for attribute labels, but the character-based attribute extraction system assumes that no two attribute values of the same attribute type occur next to each other in a collection of unstructured text. Even though this is a fairly strong assumption, it holds very well in most product descriptions. Further, the character-based attribute extraction system represents each attribute label as a single letter character, and each background label as the character, "O". In other words, the character-based attribute extraction system can represents the attribute labels and/or background labels as an annotation string. The character-based attribute extraction system can further use a fixed-width font to represent each single letter character. Even further, the character-based attribute extraction system can use a specific color to represent each single letter character, where the specific color corresponds to an attribute label represented by the single letter character. Yet even further, the character-based attribute extraction system can display, or otherwise visualize, the annotation string either below or above the original unstructured text. The representation of the annotation string can greatly ease any optional annotation performed in response to a user interaction, as described below in greater detail. While, in one example embodiment, a BIO representation is used for attribute labels, this is only an example embodiment, and, in other alternate embodiments, other types of representations can be used for attribute labels.

Thus, in one embodiment, an annotation process implemented by the character-based attribute extraction system includes three steps. In the first step, the character-based attribute extraction system assigns the correct attribute values that each attribute should take for the unstructured text (e.g., product description). In the second step, the character-based attribute extraction system automatically matches the attribute values to the text segments in the unstructured text to mark token spans that represent the text segments in order to reduce the effort needed for data annotation. However, the resulting annotations may be incomplete and inaccurate. In the third step, a human user can optionally interact with the character-based attribute extraction system and can optionally modify one or more of the annotations of the annotation string to fix one or more attribute labels assigned to one or more characters. An example annotation process is further described below in greater detail in conjunction with FIG. 6.

Figure 6:
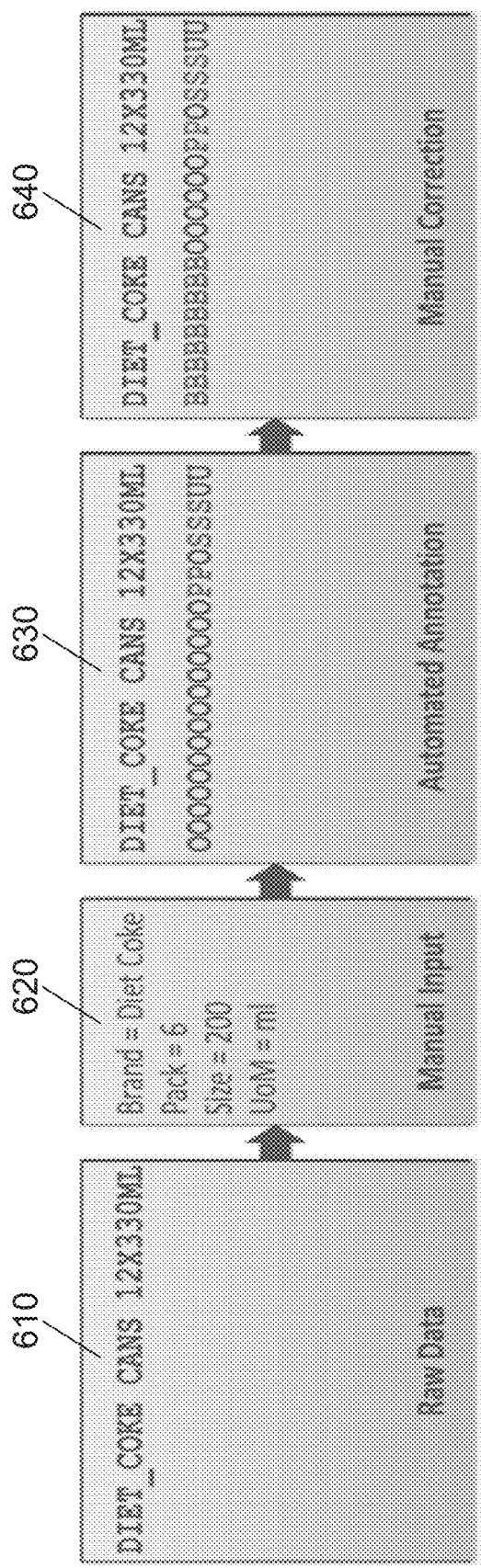
FIG. 6 illustrates an example data annotation process, according to an embodiment of the invention.

FIG. 6 illustrates an example data annotation process, according to an embodiment of the invention. In one embodiment, the example data annotation process illustrated in FIG. 6 can be implemented before a CRF is trained using training data. According to the embodiment, at 610, a collection of unstructured text, "DIET_COKE CANS 12X330ML", is received by a character-based attribute extraction system. At 620, a set of pre-defined attribute values is received by the character-based attribute extraction system. According to the illustrated embodiment, the set of pre-defined attribute values includes: Brand=Diet Coke; Pack=6; Size=200; UOM=ml. At 630, the character-based attribute extraction system automatically assigns an attribute label to each character-based token of the unstructured text, annotates each assigned attribute label using a character and color, thus, forming an annotation string, and displays, or otherwise visualizes, the annotation string below the original unstructured text. At 640, the character-based attribute extraction system optionally replaces one or more of the annotations of the annotation string with new annotations, in response to a user interaction with the character-based attribute extraction system. More specifically, the character-based attribute extraction system replaces the "O" annotations associated with the text segment "DIET COKE" with "B" annotations.

In accordance with an embodiment, attribute values extracted by the CRF may contain inaccuracies, such as abbreviations, spelling errors, additional punctuation, etc. Most analytics systems that consume attribute values require the attribute values to be normalized. Normalizing attribute values can be challenging in the presence of ambiguities and missing information. It is also not desirable to create a lot of rules to normalize the extracted text, since there can be several different variations of a single underlying attribute value, making the rules difficult to maintain.

For example, a CRF can be applied to unstructured text, and can predict the characters of the unstructured text that represent an attribute. As a more specific example, the CRF can predict that the characters of the text segment "Diet Coke" represent a brand name attribute. However, there can be many different text representations of the same brand name (e.g., "Diet Coke", "DietCoke", "Diet_Coke", "Deit Coke", "Diet Code", etc.). For a final collection of structured data (e.g., a collection of attribute label-value pairs), a standardized value of the brand name (e.g., "Diet Coke"), is the attribute value that is required to be extracted and utilized for meaningful analytics downstream.

According to an embodiment, the character-based attribute extraction system can receive a standardized knowledge base of a set of attribute values that an attribute can take. For example, even though the brand names found in a large collection of product descriptions may be noisy, a small curated list of all the brands being offered by a retailer (e.g., "Diet Coke") can be provided to the character-based attribute extraction system. The character-based attribute extraction system can link the raw, noisy "mentions" of attributes values found in unstructured text to a corresponding normalized attribute value in the target knowledge base. By establishing such a match, the character-based attribute extraction system can use the normalized attribute value as the attribute value for the attribute.

In accordance with an embodiment, the character-based attribute extraction system uses a classification-based, pairwise process to link extracted text segments of unstructured to a target knowledge base of attribute values. The pairwise linking process works as follows. Let $m_i$ be a text segment of attribute t predicted by a CRF model. Let $C_t$ be a set of all possible attribute values that attribute t can take. The character-based attribute extraction system subsequently generates all pairs, $(m_i, c_j)$, such that $c_j \in C_t$. The character-based attribute extraction system further builds a classifier to predict $P(y_{i,j})$, that represents a probability that $m_i$ and $c_j$ represent the same attribute values, where $x_{i,j}$ represents input variables of the model, and $y_{i,j}$ represents a prediction of the classifier. After classifying each such pair, the character-based attribute extraction system subsequently selects the best target value $c_j$, such that arg $\max_j P(y_{i,j})$. The features or relationships between $x_{i,j}$ and $y_{i,j}$ can include the following: exact match, match without punctuations, binned, normalized edit distance, and lexical features. In many situations, lexical features are unavoidable, since there may not be enough information in the product description to match an extracted text segment to a target attribute value.

Figure 7:
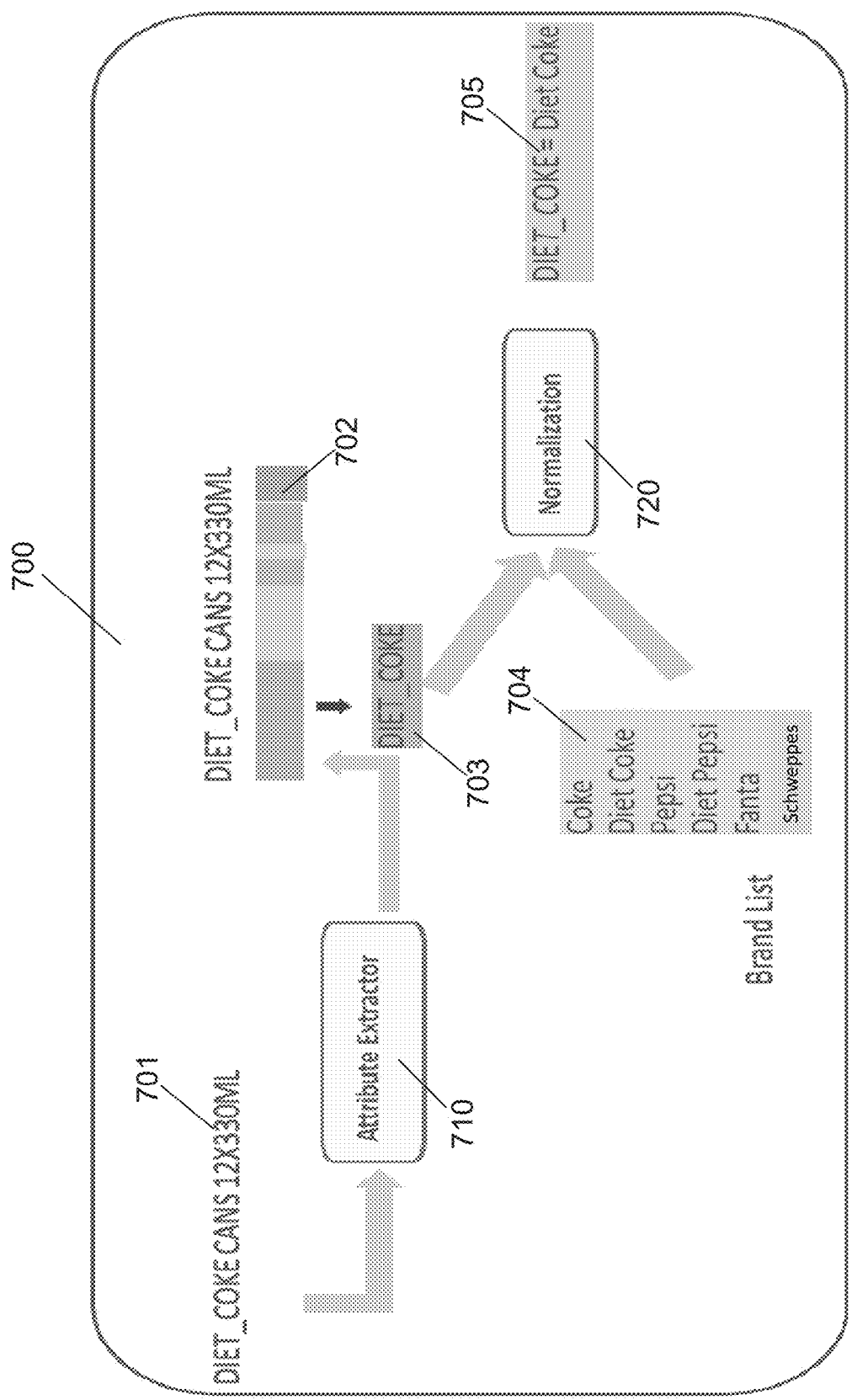
FIG. 7 illustrates an example character-based extraction of attribute values that includes attribute extraction and pairwise linking, according to an embodiment of the invention.

FIG. 7 illustrates an example character-based extraction 700 of attribute values that includes attribute extraction 701 and attribute normalization (e.g., pairwise linking) 720, according to an embodiment of the invention. In one embodiment, character-based extraction 700 may be implemented by a character-based attribute extraction system (such as system 10 of FIG. 1). Further, in one embodiment, character-based extraction 700 can be implemented after a CRF has been trained with training data. According to the embodiment, the character-based attribute extraction system retrieves unstructured text 701. In the illustrated embodiment, unstructured text 701 includes the text string, "DIET_ COKE CANS 12X330ML". The character-based attribute extraction system further performs attribute extraction 710 on unstructured text 701, where the character-based attribute extraction system tokenizes unstructured text 701, annotates unstructured text 701 with attribute labels, and generates annotation string 702, where annotation string 702 includes the annotated attribute labels for unstructured text 701. The character-based attribute extraction system further selects a text segment 703, where text segment 703 represents an extracted attribute value. In the illustrated embodiment, text segment 703 includes the text segment "DIET_COKE". The character-based attribute extraction system further retrieves a set of target attribute values (i.e., target attribute value set 704). In the illustrated embodiment, target attribute value set 704 is a brand name attribute value set that includes the following target brand name attribute values: Coke, Diet Coke, Pepsi, Diet Pepsi, Fanta, and Schweppes. The target attribute values are normalized attribute values. The character-based attribute extraction system further performs attribute normalization 720 on text segment 703, and matches text segment 703 to a best target attribute value from within target attribute value set 704. The character-based attribute extraction system further generates a linked pair 705, where the linked pair includes the extracted attribute value (i.e., DIET_COKE) and the matched target attribute value (i.e., Diet Coke). The matched target attribute value can subsequently be used by downstream analytics systems.

Figure 8:
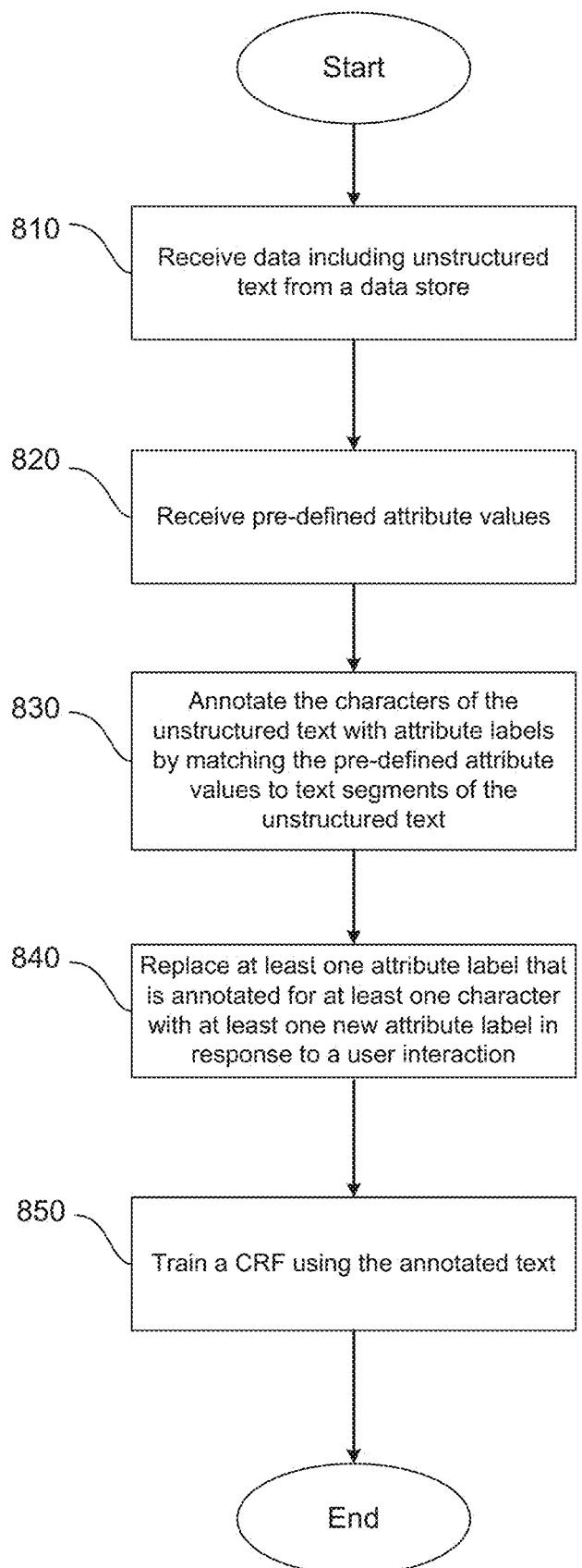
FIG. 8 illustrates a flow diagram of the functionality of a character-based attribute value extraction module, according to an embodiment of the invention.
Figure 9:
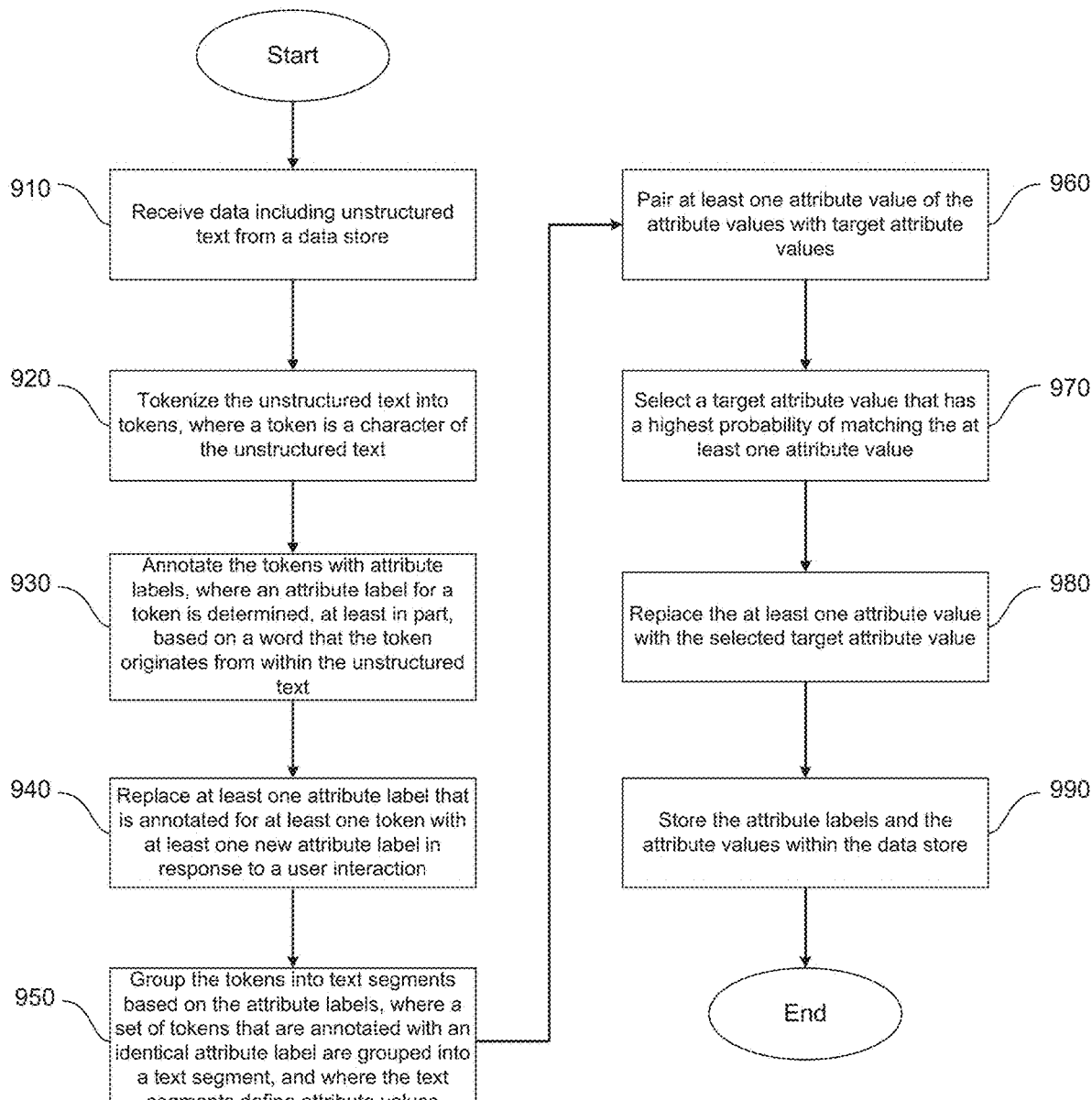
FIG. 9 illustrates a flow diagram of the functionality of a character-based attribute value extraction module, according to another embodiment of the invention.

FIG. 8 illustrates a flow diagram of the functionality of a character-based attribute value extraction module (such as character-based attribute value extraction module 16 of FIG. 1), according to an embodiment of the invention. In one embodiment, the functionality of the flow diagram of FIG. 8, and the functionality of the flow diagram of FIG. 9, are each implemented by software stored in a memory or some other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 810. At 810, data including unstructured text is received from a data store, where the unstructured text includes one or more characters. In certain embodiments, the unstructured text can be a product description. Further, in certain embodiments, the data store can be a database. The flow then proceeds to 820. At 820, one or more pre-defined attribute values are received. The flow then proceeds to 830. At 830, the one or more characters of the unstructured text are annotated with one or more attribute labels by matching the one or more pre-defined attribute values with one or more text segments of the unstructured text. This annotation converts the unstructured text to annotated text, also identified as an annotation string, where the annotation string can be visualized using a fixed-width font. The flow then proceeds to 840. At 840, at least one attribute label that is annotated for at least one character is replaced with at least one new attribute label in response to a user interaction. The flow then proceeds to 850. At 850, a CRF is trained using the annotated text. The CRF can be trained according to any known CRF training techniques. Further, in certain embodiments, the functionality of the flow diagram of FIG. 8 can be implemented before the functionality of the flow diagram of FIG. 9. The flow then ends.

FIG. 9 illustrates a flow diagram of the functionality of a character-based attribute value extraction module (such as character-based attribute value extraction module 16 of FIG. 1), according to another embodiment of the invention. The flow begins and proceeds to 910. At 910, data including unstructured text is received from a data store. In certain embodiments, the unstructured text can be a product description. Further, in certain embodiments, the data store can be a database. The flow then proceeds to 920.

At 920, the unstructured text is tokenized into one or more tokens, where a token is a character of the unstructured text. In certain embodiments, the one or more tokens can be character-based tokens. The flow then proceeds to 930.

At 930, the one or more tokens are annotated with one or more attribute labels, where an attribute label for a token is determined, at least in part, based on a word that the token originates from within the unstructured text. In certain embodiments, the attribute label for the token can be further determined, in least in part, based on a character-based conditional random field. Further, in certain embodiments, the attribute label for the token can be further determined, in least in part, based on at least one of: whether the token is a lowercase character; a shape of the token; a punctuation of the token; one or more surrounding tokens; a size of the word that the token originates from within the unstructured text; a position of the token relative to the word that the token originates from within the unstructured text; or a position of the token relative to the unstructured text. Even further, in certain embodiments, an annotation string that includes the one or more attribute labels can be visualized using a fixed-width font. The flow then proceeds to 940.

At 940, at least one attribute label that is annotated for at least one token is replaced with at least one new attribute label in response to a user interaction. The flow then proceeds to 950.

At 950, the one or more tokens are grouped into one or more text segments based on the one or more attribute labels, where a set of one or more tokens that are annotated with an identical attribute label are grouped into a text segment, and where the one or more text segments define one or more attribute values. The flow then proceeds to 960.

At 960, an attribute value of the one or more attribute values is paired with one or more target attribute values. The flow then proceeds to 970.

At 970, a target attribute value that has a highest probability of matching the attribute value is selected. The flow then proceeds to 980.

At 980, the attribute value is replaced with the selected target attribute value. In certain embodiments, 960, 970, and 980 can be part of normalizing at least one attribute value of the one or more attribute values. The flow then proceeds to 990.

At 990, the one or more attribute labels and the one or more attribute values are stored within the data store. In certain embodiments, the functionality of the flow diagram of FIG. 9 can be implemented after the functionality of the flow diagram of FIG. 8. The flow then ends.

In one embodiment, system 10 is a specialized product analytics system/device that provides analytics functionality, including providing analytics for product description data, or other types of retail data, that is in an unstructured textual format. Embodiments include providing a graphical visualization of product analytics data to allow retail managers to visualize and communicate a more accurate and complete graphical representation of analytics for product description data, or other types of retail data. Further, in one embodiment, extracted attribute values generated by system 10 can be printed on paper or made available in any other "portable" media so that the information can be easily used in the field to assist in product analytics or retail analytics. System 10 can also be part of a specialized point-of-sale ("POS") system.

Thus, a character-based attribute value extraction system is provided that can extract attribute values from unstructured text by applying character-based sequence tagging to the unstructured text that jointly tokenizes and tags character-based tokens. The character-based attribute value extraction system can further normalize the extracted attribute values by applying pairwise entity linking to the extracted attribute values. Because attributes are more useful than raw unstructured text in applications like e-commerce and retail analytics, the character-based attribute value extraction system can provide many improvements to electronic retail and e-commerce systems, such as improving relevance rankings in search results, improving faceting in e-commerce, and improving predictive models for retail analytics. Further, the character-based attribute value extraction system can significantly reduce a cost (e.g., time and money) of extracting such attributes from customer data. This can result in a significantly lowered requirement of skilled person hours. Furthermore, the attribute extraction performed by the character-based attribute value extraction system can be more accurate than previous attribute extraction techniques. Even further, solving the problem of normalization as an entity linking problem can improve generalization. More specifically, an entity-linking formulation can enable the use of features that compare a normalized and un-normalized form of an attribute. For example, edit distance-based features allow an approach to be more robust to typographical errors, misspellings, and acceptable spelling variations. In contrast, a pure classification-based approach treats a normalized string as a classification label, limiting the set of features to which a model has access.

The features, structures, or characteristics of the invention described throughout this specification may be combined in any suitable manner in one or more embodiments. For example, the usage of "one embodiment", "some embodiments", "certain embodiment", "certain embodiments", or other similar language, throughout this specification refers to the fact that a particular feature, structure, or characteristic described in connection with the embodiment may be included in at least one embodiment of the present invention. Thus, appearances of the phrases "one embodiment", "some embodiments", "a certain embodiment", "certain embodiments", or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to automatically populate fields in a data store with extracted attribute values, the extracting comprising:

receiving data comprising unstructured text from the data store, the unstructured text comprising a plurality of words and forming a description of a product, wherein each word comprises one or more characters;

tokenizing the unstructured text, one character of unstructured text at a time, into character-level tokens using a character-based model, wherein each character-level token corresponds to only one character of the received unstructured text;

annotating each of the character-level tokens with an individual attribute label or a background noise label using a character-based conditional random field (CRF), wherein the attribute label is determined based at least in part on features from a word that a character-level token originates from within the unstructured text, the background noise label corresponding to text that is not part of a first attribute value for any attribute, wherein each attribute label corresponds to a fixed number of possible corresponding attribute values and each attribute label corresponds to a portion of the description of the product;

annotating a first word of the plurality of words with at least two different attribute labels, wherein the first word comprises a plurality of characters;

grouping the character-level tokens into one or more text segments based on the attribute labels, wherein a set of character-level tokens that are annotated with an identical attribute label are grouped into a text segment, and wherein the one or more text segments define one or more attribute values and the first word is assigned at least two different attribute values based on the at least two different attribute labels;

normalizing at least one attribute value of the one or more attribute values by providing pairwise entity linking comprising pairing an attribute value of the one or more attribute values with one or more target attribute values, selecting a target attribute value that has a highest probability of matching the attribute value, and replacing the attribute value with the selected target attribute value; and storing the one or more attribute labels and the one or more attribute values within the data store.

2. The non-transitory computer-readable medium of claim 1, further comprising separating the first word into at least two different words based on the at least two different attribute labels.

3. The non-transitory computer-readable medium of claim 2, the extracting further comprising replacing at least one attribute label that is annotated for at least one token with at least one new attribute label in response to a user interaction.

4. The non-transitory computer-readable medium of claim 1, wherein the unstructured text comprises inconsistent spacing and the attribute labels comprise at least one of brand, pack size or unit of measurement.

5. The non-transitory computer-readable medium of claim 1, wherein the data store comprises a database.

6. The non-transitory computer-readable medium of claim 1, wherein the CRF is a function that is parametrized by a set of weights learned from example data that is manually annotated.

7. The non-transitory computer-readable medium of claim 1, wherein annotations of the character-level tokens are represented as an annotation string comprising a visualization of the attribute labels, further comprising displaying the annotation string with the unstructured text.

8. The non-transitory computer-readable medium of claim 1, wherein the attribute label for the token is further determined, at least in part, based on at least one of whether the token is a lowercase character, a shape of the token, or a punctuation of the token, and the features of the word include at least one of: one or more surrounding tokens, a size of the word that the token originates from within the unstructured text, a position of the token relative to the word that the token originates from within the unstructured text, or a position of the token relative to the unstructured text.

9. The non-transitory computer-readable medium of claim 1, the extracting further comprising:
receiving one or more pre-defined attribute values;
annotating one or more characters of the unstructured text with one or more attribute labels by matching the one or more pre-defined attribute values with one or more text segments of the unstructured text; and
replacing at least one attribute label that is annotated for at least one character with at least one new attribute label in response to a user interaction.

10. A computer-implemented method for automatically populating fields in a data store with extracted attribute values, the computer-implemented method comprising:
receiving data comprising unstructured text from the data store, the unstructured text comprising a plurality of words and forming a description of a product, wherein each word comprises one or more characters;
tokenizing the unstructured text, one character of unstructured text at a time, into character-level tokens using a character-based model, wherein each character-level token corresponds to only one character of the received unstructured text;
annotating each of the character-level tokens with an individual attribute label or a background noise label using a character-based conditional random field (CRF), wherein the attribute label is determined based at least in part on features from a word that a character-level token originates from within the unstructured text, the background noise label corresponding to text that is not part of a first attribute value for any attribute, wherein each attribute label corresponds to a fixed number of possible corresponding attribute values and each attribute label corresponds to a portion of the description of the product;
annotating a first word of the plurality of words with at least two different attribute labels, wherein the first word comprises a plurality of characters;
grouping the character-level tokens into one or more text segments based on the attribute labels, wherein a set of character-level tokens that are annotated with an identical attribute label are grouped into a text segment, and wherein the one or more text segments define one or more attribute values and the first word is assigned at least two different attribute values based on the at least two different attribute labels;
normalizing at least one attribute value of the one or more attribute values by providing pairwise entity linking comprising pairing an attribute value of the one or more attribute values with one or more target attribute values, selecting a target attribute value that has a highest probability of matching the attribute value, and replacing the attribute value with the selected target attribute value; and
storing the one or more attribute labels and the one or more attribute values within the data store.

11. The computer-implemented method of claim 10, further comprising separating the first word into at least two different words based on the at least two different attribute labels;
wherein the attribute labels comprise at least one of brand, pack size or unit of measurement.

12. The computer-implemented method of claim 11, further comprising replacing at least one attribute label that is annotated for at least one token with at least one new attribute label in response to a user interaction.

13. The computer-implemented method of claim 10, wherein the attribute label for the token is further determined, at least in part, based on at least one of whether the token is a lowercase character, a shape of the token, or a punctuation of the token, and the features of the word include at least one of: one or more surrounding tokens, a size of the word that the token originates from within the unstructured text, a position of the token relative to the word that the token originates from within the unstructured text, or a position of the token relative to the unstructured text.

14. A system for automatically populating fields in a data store with extracted attribute values, the system comprising:
a non-transitory computer-readable medium having instructions stored thereon; and
a processor configured to execute the instructions, wherein the instructions, when executed by the processor, cause the processor to automatically populate fields in a data store with extracted attribute values by:
receiving data comprising unstructured text from the data store, the unstructured text comprising a plurality of words and forming a description of a product, wherein each word comprises one or more characters;
tokenizing the unstructured text, one character of unstructured text at a time, into character-level tokens using a character-based model, wherein each character-level token corresponds to only one character of the received unstructured text;
annotating each of the character-level tokens with an individual attribute label or a background noise label using a character-based conditional random field (CRF), wherein the attribute label is determined based at least in part on features from a word that a character-level token originates from within the unstructured text, the background noise label corresponding to text that is not part of an attribute value for any attribute, wherein a first attribute label corresponds to a fixed number of possible corresponding attribute values and each attribute label corresponds to a portion of the description of the product;
annotating a first word of the plurality of words with at least two different attribute labels, wherein the first word comprises a plurality of characters;
grouping the character-level tokens into one or more text segments based on the attribute labels, wherein a set of character-level tokens that are annotated with an identical attribute label are grouped into a text segment, and wherein the one or more text segments define one or more attribute values and the first word is assigned at least two different attribute values based on the at least two different attribute labels;
normalizing at least one attribute value of the one or more attribute values by providing pairwise entity linking comprising pairing an attribute value of the one or more attribute values with one or more target attribute values, selecting a target attribute value that has a highest probability of matching the attribute value, and replacing the attribute value with the selected target attribute value; and storing the one or more attribute labels and the one or more attribute values within the data store.

15. The system of claim 14, further comprising separating the first word into at least two different words based on the at least two different attribute labels;

wherein the attribute labels comprise at least one of brand, pack size or unit of measurement.

16. The system of claim 15, wherein the instructions, when executed by the processor, further cause the processor to replace at least one attribute label that is annotated for at least one token with at least one new attribute label in response to a user interaction.

17. The system of claim 14, wherein the attribute label for the token is further determined, at least in part, based on at least one of whether the token is a lowercase character, a shape of the token, or a punctuation of the token, and the features of the word include at least one of: one or more surrounding tokens, a size of the word that the token originates from within the unstructured text, a position of the token relative to the word that the token originates from within the unstructured text, or a position of the token relative to the unstructured text.

18. The method of claim 10, further comprising:
receiving one or more pre-defined attribute values;
annotating one or more characters of the unstructured text with one or more attribute labels by matching the one or more pre-defined attribute values with one or more text segments of the unstructured text; and
replacing at least one attribute label that is annotated for at least one character with at least one new attribute label in response to a user interaction.

19. The system of claim 14, further comprising:
receiving one or more pre-defined attribute values;
annotating one or more characters of the unstructured text with one or more attribute labels by matching the one or more pre-defined attribute values with one or more text segments of the unstructured text; and
replacing at least one attribute label that is annotated for at least one character with at least one new attribute label in response to a user interaction.

20. The method of claim 10, wherein annotations of the character-level tokens are represented as an annotation string comprising a visualization of the attribute labels, further comprising displaying the annotation string with the unstructured text.

\* \* \* \* \*

UNITED STATES PATENT AND TRADEMARK OFFICE
CERTIFICATE OF CORRECTION

PATENT NO. : 11,010,768 B2
APPLICATION NO. : 14/700683
DATED : May 18, 2021
INVENTOR(S) : Kanani et al.

Page 1 of 1

It is certified that error appears in the above-identified patent and that said Letters Patent is hereby corrected as shown below:

On the Title Page

Column 2, Item (56) under U.S. Patent Documents, Line 3, delete "Cams" and insert -- Carus --, therefor.

Column 2, Item (57) under Abstract, Line 6, delete "in least" and insert -- at least --, therefor.

In the Specification

In Column 1, Lines 35-36, delete "in least" and insert -- at least --, therefor.

In Column 12, Line 32, delete "$C_i$" and insert -- $C_t$ --, therefor.

In Column 14, Line 12, delete "in least" and insert -- at least --, therefor.

In Column 14, Lines 14-15, delete "in least" and insert -- at least --, therefor.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*